United States Patent [19]

Kishi et al.

[11] Patent Number: 4,726,064

[45] Date of Patent: Feb. 16, 1988

[54] WIRELESS RECEPTION SYSTEM

[75] Inventors: Masahichi Kishi, Tokyo; Seizo Seki; Noboru Kanmuri, both of Kanagawa, all of Japan

[73] Assignee: Nippon Telegraph & Telephone Public Corporation, Tokyo, Japan

[21] Appl. No.: 656,796

[22] Filed: Oct. 1, 1984

[30] Foreign Application Priority Data

Sep. 29, 1983 [JP] Japan ................................ 58-179395
Sep. 8, 1984 [JP] Japan ................................ 59-187276

[51] Int. Cl.[4] ................................ H04L 9/00

[52] U.S. Cl. ................................ 380/9; 380/28; 380/38

[58] Field of Search ................ 455/26, 30; 179/1.5 S; 329/110, 112; 332/16 R, 18; 375/30

[56] References Cited

U.S. PATENT DOCUMENTS

| | | | |
|---|---|---|---|
| 3,560,659 | 2/1971 | Greefkes et al. | 375/30 |
| 3,723,878 | 3/1973 | Miller | 455/30 |
| 3,808,536 | 4/1974 | Reynolds | 179/1.5 S |
| 4,176,321 | 11/1979 | Horn | 325/325 |
| 4,355,401 | 10/1982 | Ikoma et al. | 455/26 |
| 4,433,211 | 2/1984 | McCalmont et al. | 179/1.5 S |
| 4,525,844 | 6/1985 | Scheuermann | 455/26 |
| 4,551,580 | 11/1985 | Cox et al. | 179/1.5 S |

OTHER PUBLICATIONS

Automated Maritime Telephone System, by Komura, et al., Japan Telecom. Review 10/77, 304–12.

*Primary Examiner*—Stephen C. Buczinski
*Assistant Examiner*—Aaron J. Lewis
*Attorney, Agent, or Firm*—Armstrong, Nikaido, Marmelstein & Kubovcik

[57] ABSTRACT

A wireless receiver for a PM (phase modulation) signal with a spectrum scrambling for relocation of speech spectrums for the privacy of purpose is comprised of an antenna for receiving PM modulated signals, an FM demodulator coupled with the antenna, a spectrum de-scrambler connected to output of the FM demodulator, an integration circuit connected to output of said spectrum de-scrambler, and an output terminal coupled with output of the integration circuit. Due to the location of the de-scrambler between the FM demodulator and the integration circuit, a noise spectrum of a reception signal is independent from a design of spectrum scrambling, and an excellent substantial S/N is obtained irrespective of spectrum scrambling.

3 Claims, 44 Drawing Figures

Fig. 17(ℓ)

WIRELESS RECEPTION SYSTEM

BACKGROUND OF THE INVENTION

The present invention relates to a reception system of a wireless communication signal which is spectrum scrambled for improving speech secrecy and/or co-channel interference over a transmission radio channel, in particular, relates to such a reception system for PM modulation (phase modulation) signals. The present invention is effective in improving fading noise reduction.

FIG. 1 is a prior PM receiver which has a privacy unit, and the numeral 1 is a reception antenna, 2 is a PM demodulator, 3 is a spectrum de-scrambler for privacy purpose, 4 is an output terminal, and the symbols (a) and (b) are observation points.

FIGS. 2(*a*) and 2(*b*) show spectrum of a signal (upper portion), and a noise (lower portion). When a demodulated signal has noise as shown by the shaded area of FIG. 2(*a*), that noise spectrum is inverted as shown in FIG. 2(*b*) by a spectrum de-scrambler (spectrum inverter).

FIG. 3 is a prior PM transmitter used as a transmitter for the receiver of FIG. 1, and the numeral 5 is an input terminal, 6 is a spectrum scrambler, 7 is a PM transmitter, and 8 is a transmission antenna, and the symbols (c) and (d) are observation points.

FIGS. 4(*a*) and 4(*b*) show the spectrums at the points (c) and (d) of FIG. 3.

Conventionally, the transmitter of FIG. 3 which has a spectrum scrambler 6 at the front end of the PM modulator 7 is used as a transmitter, and the receiver of FIG. 1 demodulates the PM signal by the PM demodulator 2, and then, demodulated signals are de-scrambled to reproduce original spectrums. The spectrum scrambling feature in the present explanation is, however, restricted to be a simple spectrum inversion.

The transmission radio channel between a transmitter and a receiver is a so-called PM fading channel which affects the transmission signals by fading noise.

Mobile communication is subject to be considered over the fading channels. FIG. 5 shows an average power spectrums of noise through a PM fading channel, where the horizontal axis shows frequency and the vertical axis shows logarithmic amplitude. The curve (a) shows the noise characteristics when the reception level is 10 dBμ (the field strength) at the end of the service area in a mobile communication system, and the curve (b) shows the case when the reception level is 22 dBμ (the field strength) at the center of the service area. It should be noted in FIG. 5 that the noise with −20 dB/decade of integration characteristics are observed in the whole area. Accordingly, the noise is able to be shown by the shaded triangle as shown in FIG. 2(*a*).

When a demodulated signal has noise as shown by the shaded area of FIG. 2(*a*), that noise spectrum is inverted as shown in FIG. 2(*b*) by the spectrum de-scrambler 3 (spectrum inverter).

When an FM demodulator is used instead of a PM demodulator, a fading noise with flat spectrum as shown in FIG. 6(*b*) is observed. FIG. 6(*a*) is the same as FIG. 2(*a*) which shows the spectrum of the output of a PM demodulator, and FIG. 6(*c*) is the same as FIG. 2(*b*) which is the output spectrum of the spectrum scrambler. Those three patterns of the noise characteristics as shown by the shaded area in FIGS. 6(*a*), 6(*b*) and 6(*c*) are the typical noise spectrums.

The table 1 shows the audio level of those three spectrums obtained through both the Zwicker's analysis method and experiments. As shown in the table 1, when the noise powers of the three patterns are set to be equal to each others, the audio level of FIG. 6(*a*) is the lowest of the three, the spectrum of FIG. 6(*b*) is higher than that of FIG. 6(*a*) by about 4 dB in audio level, and the audio level of FIG. 6(*c*) is the highest and is higher than about 10 dB compared with that of FIG. 6(*a*).

Accordingly, when the receiver of FIG. 1 is used as a PM demodulator, the S/N is worse by about 10 dB in comparison with the S/N when no spectrum inversion is used.

TABLE 1

(Audio level of typical spectrums)

| | Spectrum pattern | FIG. 6(a) | FIG. 6(b) | FIG. 6(c) |
|---|---|---|---|---|
| Analysis | Zwicker method (Sone) | 30.1 | 33.9 | 40.6 |
| | Relative indication (dB) | 0 | 3.5 | 10.5 |
| Experiments | CCIR (dB) | −29 | −26 | −21 |
| | DIN (noise) (dB) | −30 | −27 | −23 |

SUMMARY OF THE INVENTION

It is an object, therefore, of the present invention to overcome the disadvantages and limitations of a prior reception system by providing a new and improved reception system.

It is also an object of the present invention to provide a reception system for PM signals which have been de-scrambled for getting privacy security over the radio channel without degradation in audio noise to signal ratio.

The above and other objects are attained by a reception system which has following circuits; an FM demodulator coupled with the input antenna of the reception system, a spectrum de-scrambler connected to the output of the said FM demodulator, an integration circuit connected to the output of the said spectrum de-scrambler, and an output terminal coupled with the output of the said integration circuit to provide demodulated signals.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 7:
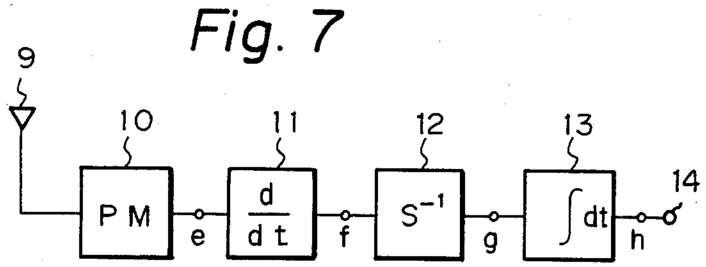
FIG. 7 is a block diagram of the PM receiver according to the present invention.
Figure 8:
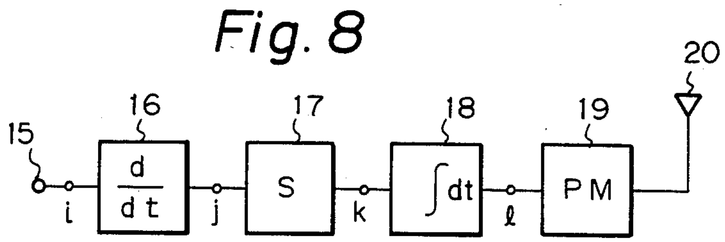
FIG. 8 is a block diagram of a PM transmitter used for a receiver of FIG. 7, FIGS. 9(*a*), 9(*b*), 9(*c*) and 9(*d*) show spectrums at some points in FIG. 7, FIGS. 10(*a*), 10(*b*), 10(*c*) and 10(*d*) show spectrums at some points in FIG. 8.

FIG. 7 is a block diagram of a receiver according to the present invention, and it features that a differential circuit is provided at the input of a spectrum de-scrambler, and an integration circuit is provided at the output of the spectrum de-scrambler. FIG. 7 also shows a PM receiver, which receives a PM signal transmitted by the transmitter, for instance, of FIG. 8. In FIG. 7, the numeral 9 is a reception antenna, 10 is a PM demodulator, 11 is a differential circuit, 12 is a spectrum de-scrambler, 13 is an integration circuit, and the symbols (e) through (h) show observation points. In FIG. 8, the numeral 15 is an input terminal, 16 is a differential circuit, 17 is a spectrum scrambler, 18 is an integration circuit, 19 is a PM transmitter, and the symbols (i) through (l) are observation points.

Figures 9A, 9B, 9C, 9D:
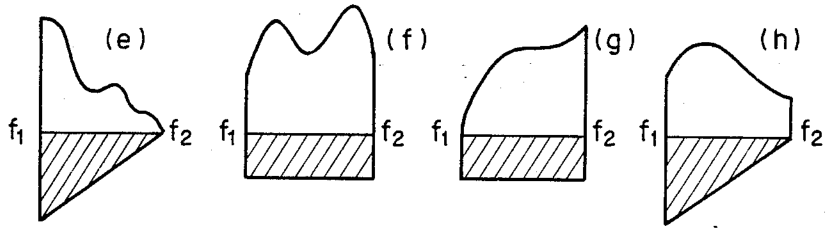
Figures 10A, 10B, 10C, 10D:
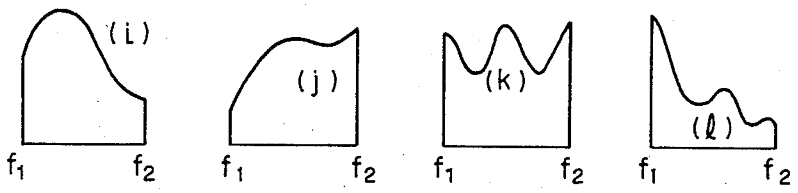

FIG. 9 shows some spectrums at the points (e) through (h) in FIG. 7, and FIG. 10 shows spectrums at the points (i) through (l) in FIG. 8. The symbols $f_1$ and $f_2$ in FIGS. 9 and 10 show the low and high edge frequencies of the speech signal passband, and for instance $f_1$ and $f_2$ being 0.3 and 3 kHz for radio transmission systems.

It is assumed that signals with the spectrum of FIG. 10(*a*) are applied to the input terminal 15 in FIG. 8, then, the input signals are differentiated by the circuit 16 to be provided the spectrum of FIG. 10(*b*). Then, the spectrum scrambler 17 scrambles the spectrum for speech security purposes, which are featured as the spectrum of FIG. 10(*c*). The scrambled spectrum is integrated by the integration circuit 18 to be provided the spectrum of FIG. 10(*d*). The PM modulator 19 modulates such signals as being featured by the spectrum of FIG. 10(*d*), and radiates the modulated signals from the antenna 20.

The radiated signals are received by the receiver of FIG. 7 through a PM fading radio channel, and received signals are demodulated by the PM demodulator 10 of FIG. 7.

The spectrum (e) at the output (e) of the PM demodulator 10 is the same as that of FIG. 10(*d*) which is the spectrum at the input of the PM modulator 19 of FIG. 8, except that the spectrum (e) at the reception side is superposed with fading noise as shown by the shaded area in FIG. 9(*a*). The demodulated signals are then applied to the differential circuit 11 which provides the spectrum of FIG. 9(*b*). It should be appreciated in FIG. 9(*b*) that the average noise power spectrum is flat, and that the noise spectrum after de-scrambling is independent from structure and/or characteristics of a spectrum de-scrambler according to the flatness of the noise power spectrum provided with the differentiated signals. The output signals of the differential circuit 11 are applied to the spectrum de-scrambler 12 which provides the spectrum of FIG. 9(*c*) and keeps the noise spectrum to be same to that of FIG. 9(*b*). The de-scrambler also changes the spectrum of the input signals from that of FIG. 9(*b*) to that of FIG. 9(*c*). Then, the de-scrambled signals are applied to the integration circuit 13 which provides the spectrum of FIG. 9(*d*).

Figures 6A, 6B, 6C:
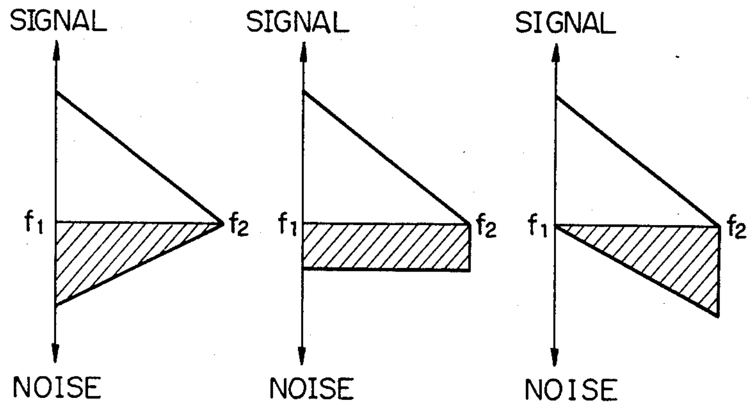

It should be noted in FIGS. 9 and 10, that the spectrum of FIG. 10(*a*) is reproduced at the output of the integration circuit 13 as shown in the upper part of FIG. 9(*d*), and that the shape of the noise power spectrum shown by the shaded area of FIG. 9(*d*) is the same of that of FIG. 6(*a*) which is the most preferable in view of low audio noise.

Figure 11:
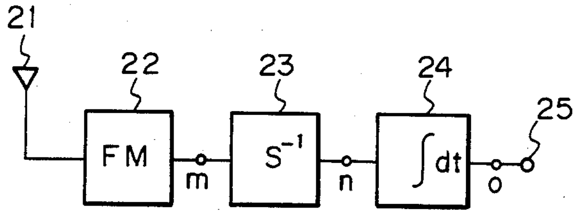
FIGS. 11 is a block diagram of the other emodiment of the present invention, FIGS. 12(*a*), 12(*b*) and 12(*c*) show spectrums at some points in FIG. 11.

FIG. 11 shows a block diagram of another embodiment of the present reception system, and the feature of the embodiment of FIG. 11 is an FM demodulator 22 which functions as both a PM demodulator and a differential circuit. In FIG. 11, the numeral 21 is a reception antenna, 22 is an FM demodulator, 23 is a spectrum de-scrambler, 24 is an integration circuit, 25 is an output terminal, and the symbols (m), (n) and (o) show the observation points.

Figures 12A, 12B, 12C:
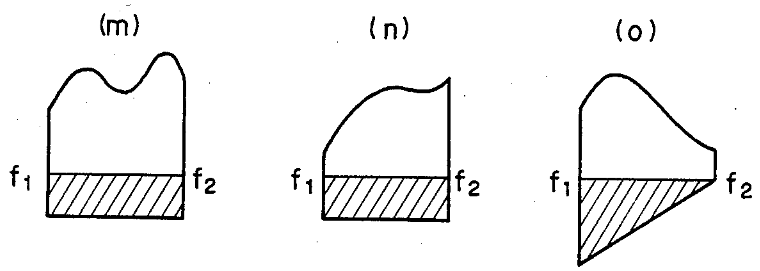

FIGS. 12(m), 12(n) and 12(o) show the spectrums at the points (m), (n) and (o) in FIG. 11, respectively.

It should be noted in FIG. 11 that the FM demodulator 22, the spectrum de-scrambler 23 and the integration circuit 24 are arranged in the same sequence as shown in the drawing. When the PM receiver of FIG. 11 receives PM signal transmitted by a PM transmitter, the spectrums at the points (m) and (n) and (o) in FIG. 11 are shown in FIG. 12(*a*), FIG. 12(*b*) and FIG. 12(*c*), respectively. Accordingly, the spectrum of an input signal as shown in FIG. 10(*a*) is reproduced as shown in FIG. 12(*c*), and the noise spectrum in FIG. 12(*c*) is shaped as shown in FIG. 6(*a*), which is the most preferable in view of the audio noise, and the speech quality is not degraded by using a spectrum scrambler and a spectrum de-scrambler.

Figure 13:
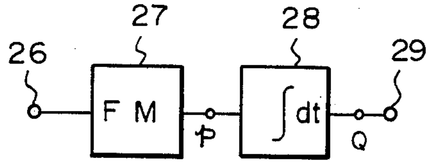
FIGS. 13 shows a configuration of a PM demodulator, FIGS. 14(*a*) and 14(*b*) show spectrums at some points in FIG. 13.

FIG. 13 shows the basic arrangement of a PM demodulator, in which the numeral 26 is an input terminal for accepting a PM signal, 27 is an FM demodulator, 28 is an integration circuit, 29 is an output terminal for demodulated signals. The structure of FIG. 13 has advantage such as that a PM demodulator is composed of an FM demodulator which is excellent in stable operation, and is easy in circuit implementations.

Figure 14A:
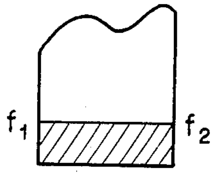
Figure 14B:
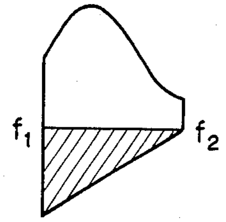

The spectrums at the points (p) and (q) in FIG. 13 are shown in FIG. 14(*a*) and FIG. 14(*b*), respectively.

Figure 15:
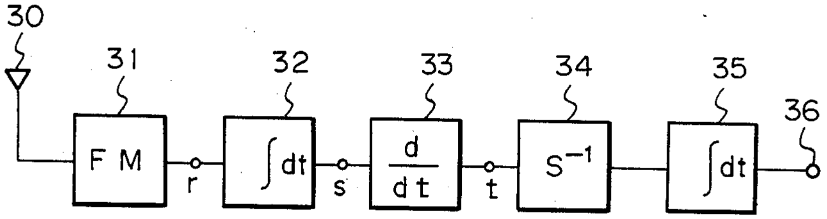
FIG. 15 is a block diagram of the reception system of the present invention,'

FIG. 15 shows the modification of the present reception system, in which the PM demodulator 10 in FIG. 7 is replaced by the combination of an FM demodulator and an integration circuit as shown in FIG. 13. In FIG. 15, the numeral 30 is a reception antenna, 31 is an FM demodulator, 32 is an integration circuit, 33 is a differential circuit, 34 is a spectrum de-scrambler, 35 is an integration circuit, 36 is an output terminal of demodulated signal, and the symbols (r), (s) and (t) are observation points.

Figure 1:
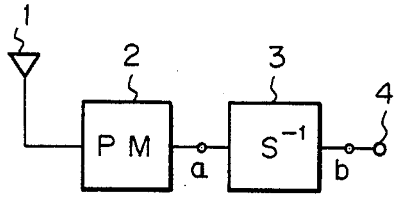
Fig. 1 PRIOR ART
FIG. 1 is a block diagram of a prior art receiver.
Figure 2A:
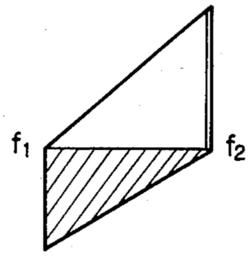
Fig. 2(a) PRIOR ART
FIGS. 2(*a*) and 2(*b*) show power spectrums at the points (a) and (b) of FIG. 1.
Figure 2B:
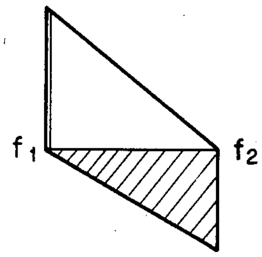
Fig. 2(b) PRIOR ART
Figure 3:
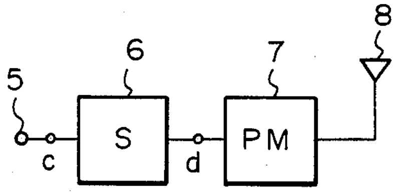
FIG. 3 is a transmitter used as a transmitter for the receiver of FIG. 1, FIGS. 4(*a*) and 4(*b*) show power spectrums at the points (c) and (d) in FIG. 3.
Figure 4A:
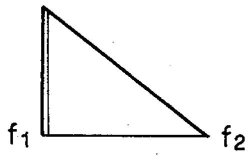
Figure 4B:
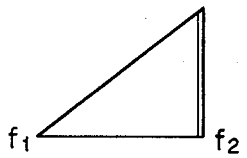
Figure 5:
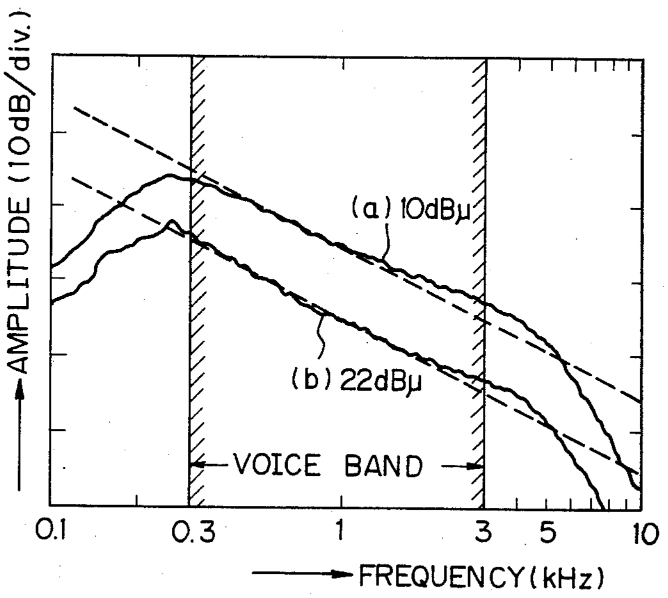
FIG. 5 shows curves of long time average noise power spectrums observed at the output of a PM demodulator through a fading channel, FIGS. 6(*a*), 6(*b*) and 6(*c*) show three typical patterns of fading noise power.

By the way, a differential circuit converts an input power spectrum G(f) to a power spectrum $f^2G(f)$, while an integration circuit converts an input power spectrum F(f) to a power spectrum $f^{-2}F(f)$, where f is frequency. Accordingly, it should be noted that the power spectrum at the point (t) in FIG. 15 is the same as the power spectrum at the point (r) in FIG. 15, since the integration ($f^{-2}$) and the differentiation ($f^2$) are cancelled with each other ($f^{-2}f^2=1$). Consequently, the integration circuit 32 and the differential circuit 33 may be omitted in FIG. 15. When those means are omitted, the structure of FIG. 15 coincides with the structure of FIG. 11. In FIG. 11, it is noted that an FM demodulator 22 and an integration circuit 24 are primary components of a PM demodulator, and the important features of the present invention is the location of installing a spectrum descrambler 23 between an output of an FM demodulator and an input of an integration circuit, while a de-scrambler of a prior art in FIG. 1 is located at an output of an integration circuit (or a PM demodulator).

Next, the theoretical analysis of the present invention when it is combined with a transmitter of FIG. 8 is discussed below.

It is assumed that an arbitrary power spectrum G(f) is applied to the input terminal 15 in FIG. 8. Then, the signal is processed by a differential circuit 16, a scrambler 17 and an integration circuit 18, then, the power spectrum T(f) at the output (1) of the integration circuit 18 is given as follows:

$$T(f)=f^{-2}S[f^2G(f)], \quad (1)$$

where S[*] shows a spectrum scrambler operation in which signal * is converted to S[*] by the scramble operation, $f^{-2}$ shows integration operation, and $f^2$ is differentiation operation.

When the power spectrum T(f) is transmitted, and is received by the receiver of FIG. 11, the spectrum at the point (m) in FIG. 11 is the differentiation of the original spectrum T(f), assuming that a PM transmission channel is both distortion and noise free. Accordingly, the spectrum R(f) at the point (m) is:

$$R(f)=f^2T(f)=f^2f^{-2}S[f^2G(f)]=S[f^2G(f)] \quad (2)$$

The demodulated spectrum R(f) is de-scrambled, and integrated. Accordingly, the output spectrum O(f) at the point (o) in FIG. 11 is:

$$O(f)=f^{-2}S^{-1}[R(f)] \quad (3)$$

where $S^{-1}[*]$ shows a de-scramble operation and $S^{-1}S[*]=SS^{-1}[*]=*$ is satisfied.

When the equation (2) is substituted into the equation (3), the following equation (4) is obtained.

$$O(f)=f^{-2}S^{-1}[S[f^2G(f)]]=f^{-2}S^{-1}S[f^2G(f)]=G(f) \quad (4)$$

Accordingly, the input power spectrum G(f) is correctly reproduced at the reception side.

Figure 16:
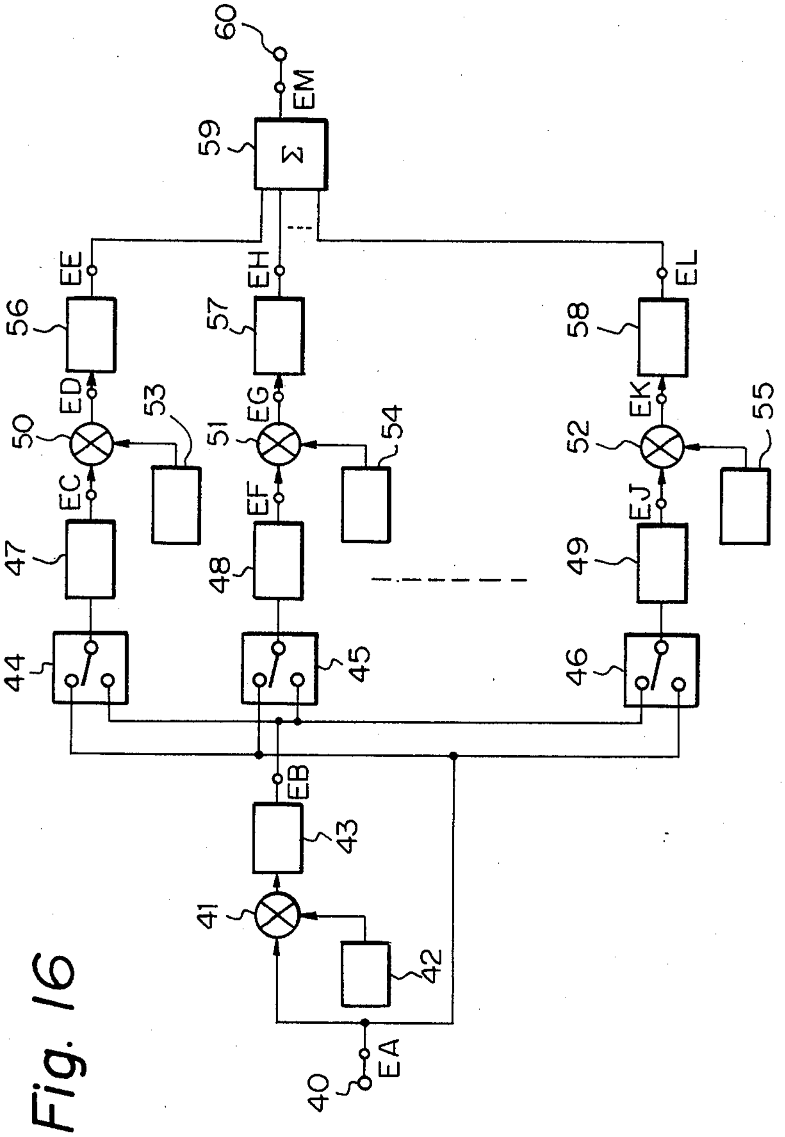
FIG. 16 is a block diagram of the spectrum descrambler according to the present invention, FIGS. 17(*a*), 17(*b*), 17(*c*), 17(*d*), 17(*e*), 17(*f*), 17(*g*), 17(*h*), 17(*i*), 17(*j*), 17(*k*), 17(*l*) and 17(*m*) show spectrums at some points in FIG. 16, FIG. 18(*a*) is an integration circuit utilized in the present invention, and FIG. 18(*b*) is the Bode diagram of the integration circuit of FIG. 18(*a*).
Figures 17A, 17B, 17C, 17D, 17E, 17F, 17G, 17H:
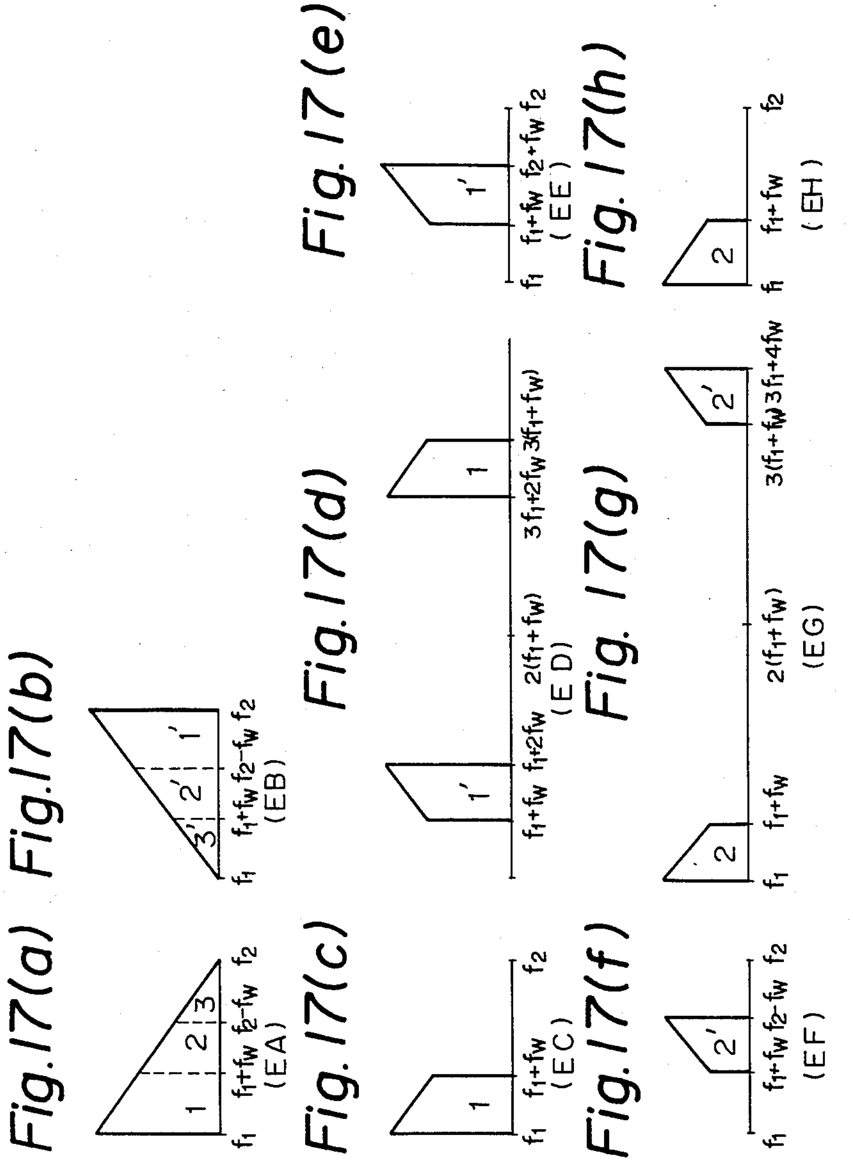
Figure 17J:
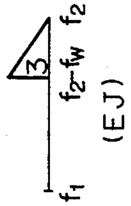
Figure 17K:
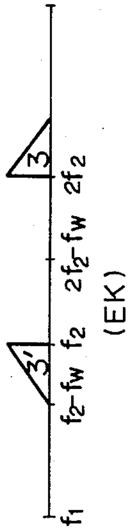
Figure 17M:
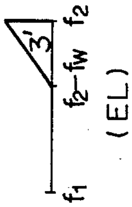
Figure 17M:
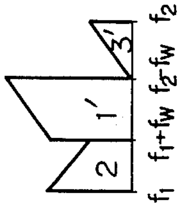

FIG. 16 shows a block diagram of a spectrum scrambler, which also functions as a spectrum de-scrambler. In the figure, the numeral 40 is an input terminal, 41 is a frequency mixer, 42 is a local oscillator, 43 is a low-pass filter, 44 through 46 are switches, 47 through 49 are bandpass filters, 50 through 52 are mixers, 53 through 55 are variable frequency local oscillators, 56 through 58 are low-pass filters with adjustable cutoff frequencies, 59 is an adder, and 60 is an output terminal. Also, the symbols EA, EB, . . . , EM are observation points. The spectrum of each observation point is shown in FIGS. 17(*a*) through 17(*l*).

It is supposed that the output frequency of the local oscillator 42 is fixed to $f_0(=f_1+f_2)$, the cutoff frequency of the low-pass filter 43 is fixed to $f_2$, and the pass band of the band-pass filters 47 through 49 are fixed to $[f_1, f_1+f_w]$, $[f_1+f_w, f_1+2f_2]$, and $[f_2-f_w, f_2]$, respectively, where $f_w=(f_2-f_1)/m$, and m is the number of the divided frequency bands for spectrum scramble.

It is assumed that the value m is taken to be three for ease of understanding the following explanation.

It is supposed that the oscillation frequencies of the variable frequency local oscillators 53 through 55 are $2(f_1+f_w)$, $2(f_1+f_w)$, and $2f_2-f_w$, respectively, and the cutoff frequencies of the variable cutoff frequency low-pass filters 56 through 58 are $f_1+2f_w$, $f_1+f_w$, and $f_2$, respectively, and the switches 44 through 46 are connected to EA side, EB side, and EA side, respectively.

When the input signals having the spectrum shown in FIG. 17(*a*) (EA) are applied to the input terminal 40, the spectrum inverted signals as shown in FIG. 17(*b*) (EB) are observed at the point (EB). Each bandpass filter 47 through 49 derives one third of frequency band from the input signal as shown in FIGS. 17(*c*), 17(*f*) and 17(*i*), respectively. The sub-frequency band marked with (') (dash) shows that the spectrum is inverted.

The switch 44 and the filter 47 derive the first spectrum component in the frequency band (1) from EA, and therefore, the spectrum at the point EC is given as shown in FIG. 17(*c*). Then, the mixer 50 provides the product of the output (EC) of the bandpass filter 47 and output of the local oscillator 38. Here, the output signals of the mixer 50 have a pair of side bands as shown in FIG. 17(*d*) (ED). Next, the lowpass filter 56 derives the lower side-band component from the product output of the mixer 50, then, the spectrum (EE) is obtained at the output EE of the filter 56 as shown in FIG. 17(*e*). Thus, the first spectrum component (1) is inverted, and is also shifted by frequency $f_w$.

Concerning the second spectrum component (2), both the switch 45 and the bandpass filter 48 derive the inverted component (2'), then, the mixer 51 which receives the output of the local oscillator 54 provides a pair of sidebands as shown in FIG. 17(*g*), then, the low-pass filter 57 derives only the lower side band. Therefore, the spectrum at the point (EH) is shown in FIG. 17(*h*), in which the second component (2) is shifted downward by frequency $f_w$.

Concerning the third component (3), the switch 46 and the bandpass filter 49 derive the third component as shown in FIG. 17(*j*), then, the mixer 52 which receives the local frequency by the oscillator 55 provides a pair of side bands as shown in FIG. 17(*k*) at the point EK, then, the lowpass filter 58 provides the lower sideband as shown in FIG. 17(*l*) at the point EL. The spectrum component (3) is spectrum inverted in the same sub-band.

The adder 59 provides the sum of the signals at the points EE, EH, and EL, then, the output of the adder 59 at the point EM is shown in FIG. 17(*m*).

It should be noted that the signal in FIG. 17(*m*) has the privacy or secret facility of the orignal signal of FIG. 17(*a*).

The number of combinations of the sub-frequency bands depends upon both the connection ($2^m$) of the switches 44–46, and the permutation (m!) of sub-bands, then, the number of the combination of the scrambling amounts to $2^m$m!.

A de-scrambler operates similarly to a scrambler. That is to say, the first component (1) at the point EM is shifted by frequency $f_w$ in upper frequency direction, the second component (2) is spectrum inverted and is shifted by frequency $f_w$ in lower frequency direction, and the third component (3) is inverted, then, the original spectrum (EA) is reproduced. The de-scrambling for that operation is accomplished in the structure of FIG. 16 by connecting the switches 44 through 46 to EB side, EA side, and EB side, respectively, the frequency of the local oscillators 53 through 55 are $2f_l+3f_w$, $2(f_l+f_w)$, and $2(f_l+2f_w)$, respectively, and the cutoff frequencies of the lowpass filters 56 through 58 are $f_2$, $f_l+f_w$, and $f_l+2f_w$, respectively.

Figure 18A:
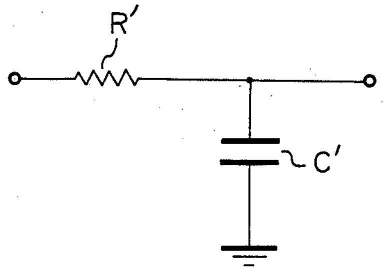
Figure 18B:
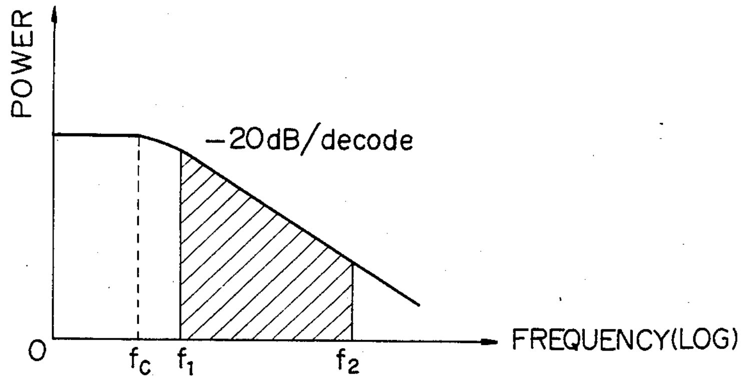

FIG. 18(*a*) shows an integration circuit according to the present invention, in which the symbol R′ is a resistor (ohm) coupled between an input terminal and an output terminal of the integration circuit, and C′ is a capacitor (Farad) coupled between the output terminal and the ground. FIG. 18(*b*) is the Bode diagram showing the characteristics of the circuit of FIG. 18(*a*), in which the horizontal axis shows logarithmic frequency, and the vertical axis also shows logarithmic amplitude, $f_l$ and $f_2$ are lower and upper limit frequencies of a voice band, respectively, $f_c$ is cutoff frequency of a primary lowpass filter and $f_c=\frac{1}{2}\pi R'C'$ is satisfied.

When $f_c<f_l$ is satisfied, the frequency response of a primary lowpass filter in cutoff frequency region coincides with an integration filter. Small errors of R′ and C′ do not affect the integration characteristics (−20 dB/decade), although they partially affect the cutoff frequency $f_c$.

Finally, the specific advantages obtained by the present invention are enumerated.

(1) a privacy communication is obtained.

(2) An excellent speech quality is obtained irrespective of the use of spectrum scrambling-descrambling (3) The structure of the present apparatus is simple, and so the manufacturing cost of equipment does not raise.

From the foregoing, it will now be apparent that a new and improved reception system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A wireless reception system for phase modulated (PM'd) scrambled speech signals having original frequency spectra thereof relocated by spectrum scrambling, comprising:

an input terminal accepting a phase modulated scrambled input speech signal;

a frequency modulation demodulator coupled with said input terminal;

a spectrum de-scrambler coupled with said frequency modulation demodulator output for relocating frequency spectra of said input speech signal to reproduce the original frequency spectra of said speech signals before spectrum scrambling thereof;

an integration circuit coupled with an output of said spectrum de-scrambler said integration circuit and said frequency modulation demodulator functioning as a phase modulation demodulator; and an output terminal coupled with an output of said integration circuit to provide a demodulated signal having frequency spectra reproducing the original frequency spectra of said speech signals before spectrum scrambling thereof.

2. A wireless reception system for a phase demodulation system according to claim 1, wherein said integration circuit comprises a resistor coupled between an input and an output of the integration circuit, and a capacitor coupled between said output and a ground.

3. A wireless reception system for phase modulated (PM'd) scrambled speech signals having original frequency spectra thereof relocated by spectrum scrambling, comprising:

a phase modulation demodulator demodulating phase modulated spectrum reception wireless speech signal;

a differential circuit coupled with an output of the phase demodulation demodulator output;

a spectrum de-scrambler coupled with the differential circuit's output, said spectrum de-scrambler relocating frequency spectra of said reception wireless speech signal to reproduce the original frequency spectra of said speech signals before spectrum scrambling thereof;

an integration circuit coupled with the spectrum de-scrambler output; and an output terminal coupled with an output of the integration circuit to provide a demodulated speech signal having frequency spectra reproducing the original frequency spectra of said speech signals before spectrum scrambling thereof.

* * * * *